US012659985B2

(12) United States Patent (10) Patent No.: US 12,659,985 B2
Lee et al. (45) Date of Patent: Jun. 16, 2026

(54) PRIORITY ACCESS ON NON-TERRESTRIAL NETWORKS

(71) Applicant: NOKIA TECHNOLOGIES OY, Espoo (FI)

(72) Inventors: Gilsoo Lee, Lisle, IL (US); Hyun-Su Cha, Oak Park, IL (US)

(73) Assignee: Nokia Technologies Oy, Espoo (FI)

( * ) Notice: Subject to any disclaimer, the term of this patent is extended or adjusted under 35 U.S.C. 154(b) by 991 days.

(21) Appl. No.: 17/877,668

(22) Filed: Jul. 29, 2022

(65) Prior Publication Data

US 2024/0040608 A1 Feb. 1, 2024

(51) Int. Cl.
*H04W 72/542* (2023.01)
*H04W 72/23* (2023.01)
*H04W 72/566* (2023.01)

(52) U.S. Cl.
CPC ......... *H04W 72/569* (2023.01); *H04W 72/23* (2023.01); *H04W 72/542* (2023.01)

(58) Field of Classification Search
None
See application file for complete search history.

(56) References Cited

U.S. PATENT DOCUMENTS

| | | |
|---|---|---|
| 11,246,042 B2 | 2/2022 | Tsui et al. |
| 2010/0054145 A1* | 3/2010 | Frenger ............... H04W 72/542 |
| | | 370/252 |

| | | | |
|---|---|---|---|
| 2017/0142741 A1* | 5/2017 | Kaur ................... | H04W 72/121 |
| 2017/0273094 A1* | 9/2017 | Cheng ............... | H04W 72/0453 |
| 2021/0344411 A1* | 11/2021 | Choquette ............ | H04B 7/0617 |
| 2022/0046490 A1 | 2/2022 | Tripathi et al. | |
| 2022/0078654 A1 | 3/2022 | Manolakos et al. | |
| 2022/0086713 A1 | 3/2022 | Maattanen et al. | |
| 2022/0095324 A1* | 3/2022 | Huang ................. | H04L 5/0053 |
| 2023/0055304 A1* | 2/2023 | Shim ................... | H04W 72/541 |
| 2024/0147283 A1* | 5/2024 | Hu ...................... | H04W 52/367 |

OTHER PUBLICATIONS

3GPP TS 38.214 V17.2.0 (Jun. 2022), Technical Specification, 3rd Generation Partnership Project; Technical Specification Group Radio Access Network; NR; Physical layer procedures for data (Release 17), Jun. 2022.
3GPP TS 38.321 V17.0.0 (Mar. 2022), Technical Specification, 3rd Generation Partnership Project; Technical Specification Group Radio Access Network; NR; Medium Access Control (MAC) protocol specification (Release 17), Mar. 2022.

(Continued)

*Primary Examiner* — Mohammad S Adhami

(74) *Attorney, Agent, or Firm* — Lippes Mathias LLP

(57) ABSTRACT

Systems, methods, apparatuses, and computer program products for connected mode mobility management for group of users in a vehicle and served by the non-terrestrial network deployments are provided. For example, a method can include detecting, by a user equipment, a cell-edge condition while the user equipment is being served through non-terrestrial radio access. The user equipment can also initiate prioritized transmission conditioned on the detected cell-edge condition and can transmit uplink data transmission using the prioritized transmission before leaving coverage provided by the non-terrestrial radio access.

12 Claims, 7 Drawing Sheets

(56) References Cited

OTHER PUBLICATIONS

3GPP TS 38.331 V17.0.0 (Mar. 2022), Technical Specification, 3rd Generation Partnership Project; Technical Specification Group Radio Access Network; NR; Radio Resource Control (RRC) protocol specification (Release 17), Mar. 2022.

3GPP TR 38.821 V16.1.0 (May 2021), Technical Report, 3rd Generation Partnership Project; Technical Specification Group Radio Access Network; Solutions for NR to support non-terrestrial networks (NTN) (Release 16), May 2021.

3GPP TR 36.763 V17.0.0 (Jun. 2021), Technical Report, 3rd Generation Partnership Project; Technical Specification Group Radio Access Network; Study on Narrow-Band Internet of Things (NB-IoT) / enhanced Machine Type Communication (eMTC) support for Non-Terrestrial Networks (NTN) (Release 17), Jun. 2021.

3GPP TR 38.811 V15.4.0 (Sep. 2020), Technical Report, 3rd Generation Partnership Project; Technical Specification Group Radio Access Network; Study on New Radio (NR) to support non-terrestrial networks (Release 15), Sep. 2020.

3GPP TS 38.213 V17.2.0 (Jun. 2022), Technical Specification, 3rd Generation Partnership Project; Technical Specification Group Radio Access Network; NR; Physical layer procedures for control (Release 17), Jun. 2022.

3GPP TS 38.212 V17.2.0 (Jun. 2022), Technical Specification, 3rd Generation Partnership Project; Technical Specification Group Radio Access Network; NR; Multiplexing and channel coding (Release 17), Jun. 2022.

MediaTek Inc et al., "WID on NB-IoT/eMTC support for NTN," 3GPP Draft; RP-211601, 3GPP TSG RAN Meeting #92-e, Electronic Meeting, Jun. 14-18, 2021.

MediaTek Inc., "New WID on IoT NTN enhancements," 3GPP Draft; RP-213596, 3GPP TSG RAN Meeting #94e, Electronic Meeting, Dec. 6-17, 2021.

RAN Vice-Chair (AT&T) et al., "New WI: NR NTN (Non-Terrestrial Networks) enhancements," 3GPP Draft; RP-213690, 3GPP TSG RAN Meeting #94e, Electronic Meeting, Dec. 6-17, 2021.

MediaTek Inc., "[IoT-NTN] AI summary of 9.2.3.2 Invited tdoc input (MediaTek)," 3GPP Draft; R2-2203721, 3GPP TSG-RAN WG2 Meeting #117-e, Online, Feb. 21-Mar. 3, 2022.

Lenovo et al., "Satellite assistance information and exchange for discontinuity prediction in IoT NTN," R2-2202589, 3GPP TSG-RAN WG2 Meeting #117 electronic, Online, Feb. 21-Mar. 3, 2022.

Nokia et al., "On IoT NTN open issues for Discontinuous Coverage and User plane," R2-2203258, 3GPP TSG-RAN WG2 Meeting #117 Electronic, Elbonia, Feb. 21-Mar. 2, 2022.

* cited by examiner

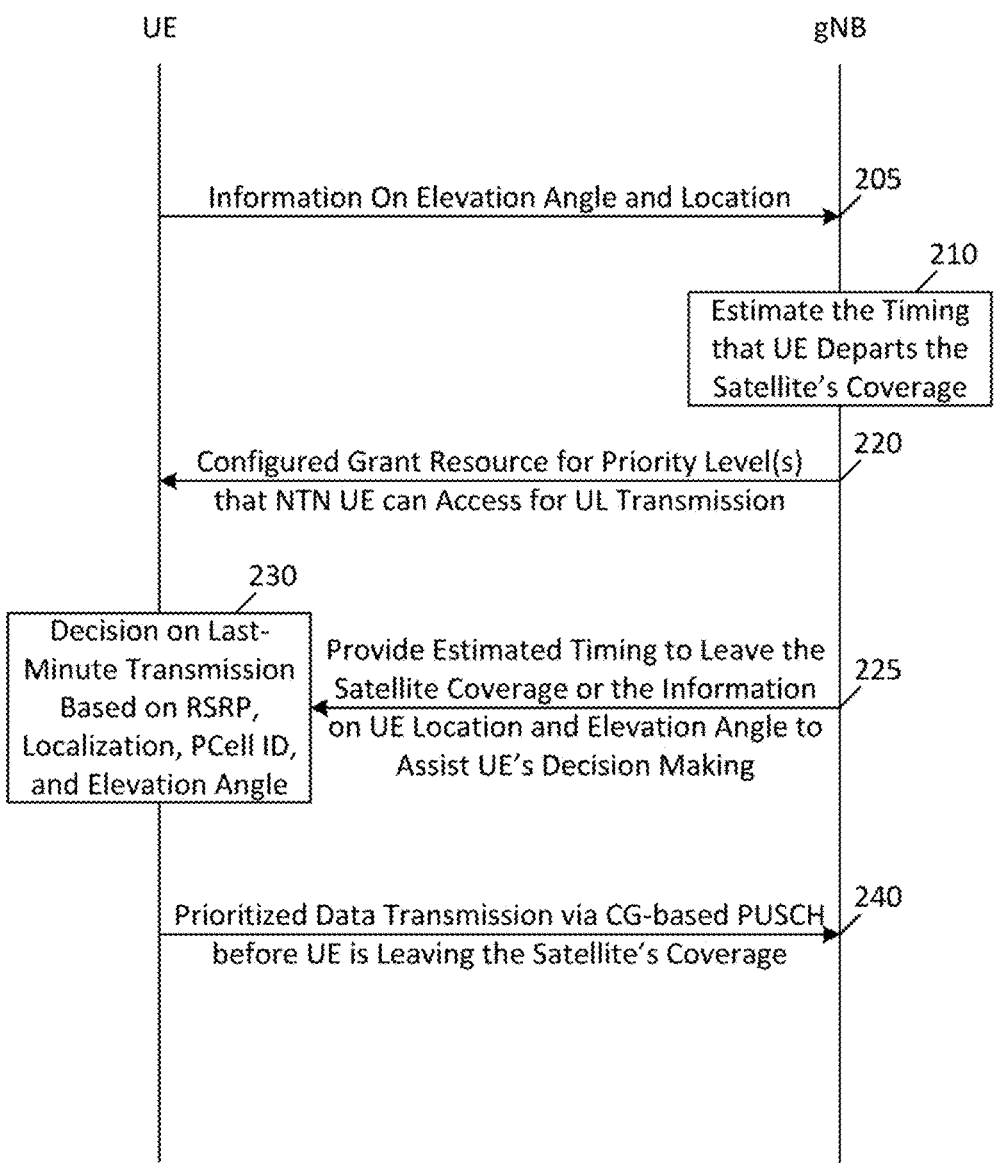

UE                                                                                    gNB

Information On Elevation Angle and Location          205

Estimate the Timing
that UE Departs the
Satellite's Coverage          210

Configured Grant Resource for Priority Level(s)          220
that NTN UE can Access for UL Transmission

230

Decision on Last-
Minute Transmission
Based on RSRP,
Localization, PCell ID,
and Elevation Angle Provide Estimated Timing to Leave the
Satellite Coverage or the Information          225
on UE Location and Elevation Angle to
Assist UE's Decision Making Prioritized Data Transmission via CG-based PUSCH          240
before UE is Leaving the Satellite's Coverage

FIG. 2A

Multiple UEs may perceive that they are leaving the satellite coverage

Satellite moving direction

Coverage area changes with satellite location

Highest priority

UE without the highest priority can configure a backoff timer

PRIORITY ACCESS ON NON-TERRESTRIAL NETWORKS

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing priority access to non-terrestrial access, for example to assist in discontinuous coverage scenarios.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least memory including computer program. The at least one memory and the computer program can be configured to, with the at least one processor, cause the apparatus at least to perform detecting a cell-edge condition while the apparatus is being served through non-terrestrial radio access. The apparatus can also perform initiating prioritized transmission conditioned on the detected cell-edge condition and transmitting uplink data transmission using the prioritized transmission before leaving coverage provided by the non-terrestrial radio access.

An embodiment may be directed to an apparatus. The apparatus can include at least one processor and at least memory including computer program. The at least one memory and the computer program can be configured to, with the at least one processor, cause the apparatus at least to perform configuring a user equipment with a prioritized transmission resource and an indicator of use of the prioritized transmission resource. The apparatus can also perform configuring the user equipment to initiate use of the prioritized transmission resource based on triggering conditions while the user equipment is being served through non-terrestrial radio access. The apparatus can further perform indicating to the user equipment to report the indicator of use of the prioritized transmission resource upon triggering prioritized transmission An embodiment may be directed to a method. The method can include detecting, by a user equipment, a cell-edge condition while the user equipment is being served through non-terrestrial radio access. The method can also include initiating, by the user equipment, prioritized transmission conditioned on the detected cell-edge condition. The method can further include transmitting, by the user equipment, uplink data transmission using the prioritized transmission before leaving coverage provided by the non-terrestrial radio access.

An embodiment may be directed to a method. The method can include configuring, by a network element, a user equipment with a prioritized transmission resource and an indicator of use of the prioritized transmission resource. The method can also include configuring, by the network element, the user equipment to initiate use of the prioritized transmission resource based on triggering conditions while the user equipment is being served through non-terrestrial radio access. The method can further include indicating, by the network element, to the user equipment to report the indicator of use of the prioritized transmission resource upon triggering prioritized transmission.

An embodiment may be directed to an apparatus. The apparatus can include means for detecting a cell-edge condition while the apparatus is being served through non-terrestrial radio access. The apparatus can also include means for initiating prioritized transmission conditioned on the detected cell-edge condition. The apparatus can further include means for transmitting uplink data transmission using the prioritized transmission before leaving coverage provided by the non-terrestrial radio access.

An embodiment may be directed to an apparatus. The apparatus can include means for configuring a user equipment with a prioritized transmission resource and an indicator of use of the prioritized transmission resource. The apparatus can also include means for configuring the user equipment to initiate use of the prioritized transmission resource based on triggering conditions while the user equipment is being served through non-terrestrial radio access. The apparatus can further include means for indicating to the user equipment to report the indicator of use of the prioritized transmission resource upon triggering prioritized transmission.

BRIEF DESCRIPTION OF THE DRAWINGS

For proper understanding of example embodiments, reference should be made to the accompanying drawings, wherein:

FIG. 2A illustrates a signal flow diagram of a method involving configured grant physical uplink shared channel, according to certain embodiments;

DETAILED DESCRIPTION

Figure 1:
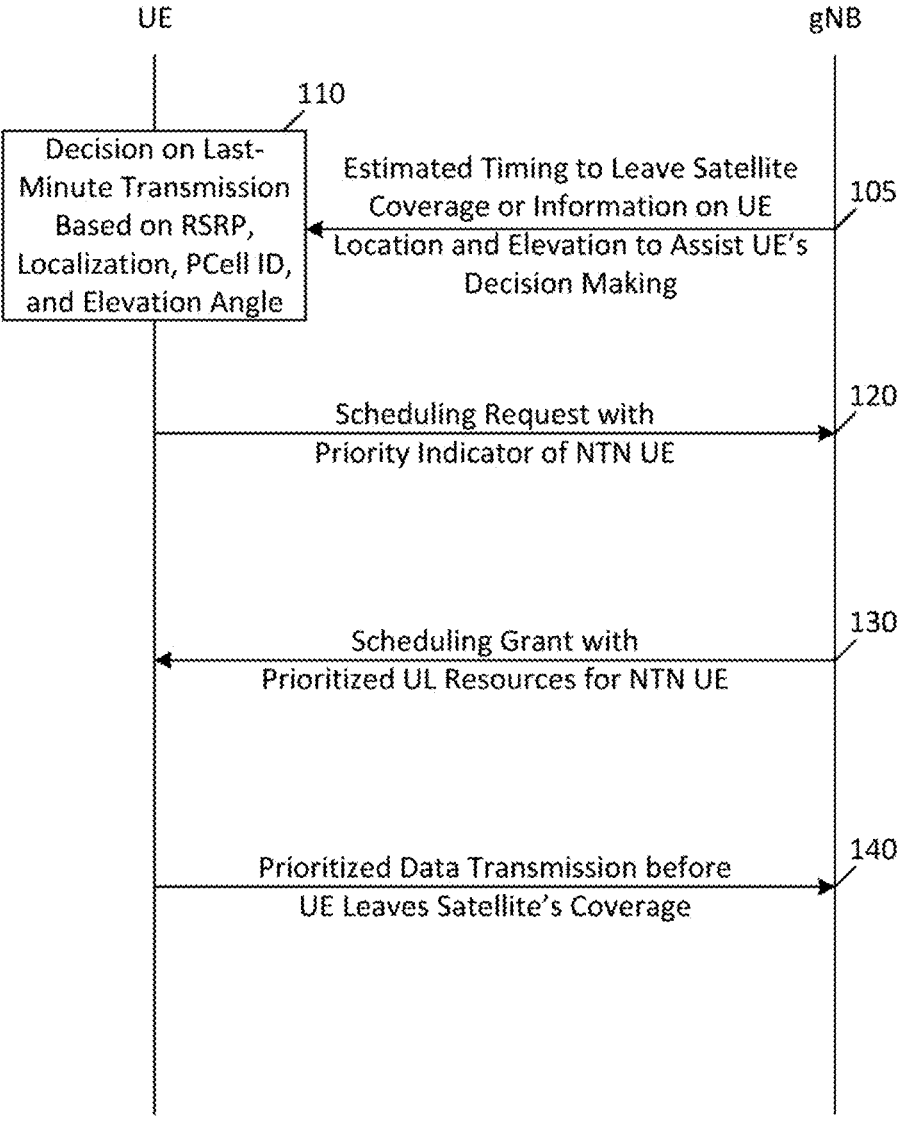
FIG. 1 illustrates a signal flow diagram of a method involving a scheduling request, according to certain embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing connected mode mobility management for aerial vehicle/cruise ship and non-terrestrial network deployments, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to narrowband (NB) internet of things (IoT)/enhanced machine type communication (eMTC) in non-terrestrial networks (NTNs). Low-earth orbit (LEO) satellites may be used in such applications.

Due to motion of a LEO satellite, a user equipment (UE) can be located outside of satellite coverage. Cells of LEO satellites can move along the surface of the earth and can follow the satellite coverage, which may move around 7500 m/s. Therefore, satellite coverage may highly depend on a satellite constellation and a network provider's satellite deployment, thus yielding a discontinuous coverage in NTN scenarios. Fundamentally, telecommunication by using LEO satellites may be complicated because the satellites move so quickly across the sky and therefore require effort to track from the ground.

There may be power limitations on UEs. Thus, in the case of fast-changing coverage, there may be value in addressing power consumption issues in the case of discontinuous coverage.

Satellite assistance, such as the provision of ephemeris information, in combination with UE location information can be used to help UEs in an IoT NTN perform measurement and cell selection/reselection, in addition to physical layer cell identifier (PCI) and frequency information included in the broadcast system information.

Satellite assistance information can be used for the handling of coverage holes or discontinuous satellite coverage in a power efficient way. For a UE, it may be valuable to predict discontinuous coverage based on the satellite assistance information. To the extent that is possible and reasonable, the UE may benefit from avoiding attempts to camp or connect when there is no satellite coverage. Likewise, to the extent that is possible and reasonable, the network may benefit from avoiding attempts to reach UEs that are out of coverage.

One aspect of handling discontinuous satellite coverage is that the UE and the network may be synchronized with respect to the timing of when the UE is awake and reachable, for example for paging. Provisioning of satellite assistance information can be performed using system Information (SI) message(s) for IoT NTN.

Mobility and service continuity in satellite coverage may consider satellite movement but also other issues, such as propagation delay. For example, as the orbit speed is reduced, the propagation delay increases. For example, low earth orbits may be at 2,000 kilometers (km), whereas geostationary orbit may be at 35,786 km.

In the case of low earth orbit satellite coverage, a user equipment may be in the coverage of a given satellite only for a very short time. Thus, considering satellite movement, it may be beneficial to allow a user equipment to complete transmission before the UE leaves the satellite coverage, particularly because satellite coverage may be discontinuous. For example, although satellite constellation may contain many satellites, as the UE leaves the coverage of one satellite, there may be a time period before the next satellite coverage begins.

In the case of discontinuous coverage on non-terrestrial networks, the causes of the UE moving outside of the satellite coverage may be the extremely high mobility of satellite and/or UE movement. For example, the relative location of even a stationary UE within the cell coverage can change over time. It is also possible that a UE moves within the cell coverage. There can be at least two ways in which satellite coverage can be characterized: earth-moving coverage, in which the boundaries of a given cell are constantly changing along a path, in view of the orbital motion of the satellite, and earth-fixed coverage, in which the boundaries of the cell may be essentially constant. In the case of a low earth orbit satellite, maintaining earth-fixed coverage may be challenging, while earth-fixed coverage may be more typical for geostationary satellites. In the case of earth-moving coverage, the coverage may move many orders of magnitude more quickly than a typical user equipment. Nevertheless, even in an earth-moving coverage scenario, a user equipment near a cell boundary may move out of cell coverage in a direction perpendicular to the path of the earth-moving coverage. Thus, discontinuous coverage may result from satellite movement, UE movement, or both.

As a UE approaches the edge of satellite coverage, it can be anticipated that satellite coverage will not cover the UE in the near future. The UE in out of coverage may not guarantee prompt reconnection to the network due to discontinuous coverage. For instance, a LEO satellite may be in view of a stationary UE from horizon to horizon for about 20 minutes. Since each LEO satellite may have many beams, the time such a UE stays within a beam may be for only a few minutes.

Therefore, before a coverage outage of a UE, the UE may attempt to maximize the uplink transmission of latency-critical data. It may be particularly beneficial for an IoT-type UE to complete the transmission in the discontinuous coverage since the information, for example sensor data, may need to be sent to the network (NW) in a timely manner. Also, it may be beneficial for the UE to be able to communicate with the NW before leaving satellite coverage to send a report so that RRC status can be updated from RRC_CONNECTED to RRC_IDLE and so that the NW can be aware of the context change, for example that the UE is losing satellite coverage.

Multiple UEs may be able to send their data and each UE can indicate that the UE's own data has high priority. Depending on processing capability and interference, the next generation node B (gNB) can lose or ignore data and require retransmission. Thus, support of UEs that are about to lose their connection with the satellite type of gNB may pose challenges. Certain embodiments provide a method enabling a UE to perform the last-minute uplink transmission for data transmission before leaving satellite coverage.

The coverage of satellites may be described using various parameters. For example, satellite coverage may be described in terms of a satellite footprint reference point on the ground and a satellite coverage radius. Such parameters may be used to implement cell-edge detection and signaling flow in certain embodiments. Consequently, once a cell-edge is detected in an NTN scenario, certain embodiments of last-minute prioritized transmission can be used.

Certain embodiments may be relevant to various aspects of wireless communication, including the third generation partnership project (3GPP), fifth generation new radio (5G-NR), and UEs including those that use NB-IoT/eMTC in non-terrestrial networks. Certain embodiments provide a prioritized transmission method for a UE near a cell-edge location. In particular, when a UE's location is approaching close to the edge of the satellite coverage due to UE or satellite movement, the UE can initiate prioritized transmission.

A parameter that can be used for indicating priority is phy-PriorityIndex as described in 3GPP technical specification (TS) 38.331 and TS 38.213. The UE could determine the priority index, and, hence, if the UE has some latency critical data, the UE could transmit the data with a high priority.

In certain embodiments, as discussed in more detail below, the network can configure a UE with a dedicated priority for specific CG-based physical uplink shared channel (PUSCH) resources. Additionally, certain embodiments can involve the network allocating high processing resources on reception of data from the prioritized PUSCH resource. Certain embodiments provide a prioritized transmission method for a UE near a cell-edge location. In particular, when a UE's location is approaching close to the edge of the satellite coverage due to UE or satellite movement, the UE can initiate the prioritized transmission.

A PUSCH or a physical uplink control channel (PUCCH) transmission other than PUCCH transmissions with sidelink (SL) hybrid automatic repeat request acknowledgment (HARQ-ACK) reports, including repetitions if any, can be of priority index p0 or of priority index p1. However, the current priority transmission with priority index may not be enough to support UEs that are about to lose coverage as the priority decision is up to UE implementation. Many UEs can transmit PUS CH with the same high priority. In that case, the gNB only has limited processing capability to process all the received data. If all UEs transmit PUSCH with the high priority index, for example p1, the gNB implementation may have to select/prioritize the data from a part of UEs. Furthermore, since fronthaul capacity between radio unit (RU) and distributed unit (DU) is limited, it is also possible that the received signals from some UEs could be lost or deprioritized. The gNB may request UE to retransmit or repetition. However, since the UE could determine the high priority for a certain uplink data, the gNB still cannot differentiate the priority between different UEs. Certain embodiments provide a triggering criterion for another level of priority state beyond p1 and p0, which priority can be associated with a dedicated priority indicator in order to provide seamless service for NTN UEs.

Certain embodiments provide a prioritized transmission method for a UE at a location near a cell-edge. In particular, when a UE's location approaches the edge of satellite coverage due to UE or satellite movement, the UE can initiate a prioritized transmission. The following UE behavior can take into consideration LEO mobility and UE measurement.

In certain embodiments, the UE can be configured with a dedicated priority indicator for scheduling request (SR) resource transmission and can also be configured with triggering criterion/condition of this priority indicator. The priority indicator may be designated as p2 and may be in addition to the existing p0 and p1 of phy-PriorityIndex. The UE may send a specific SR resource including the dedicated priority indicator when the triggering condition is met.

When the UE is static or movement is within a certain range or threshold, the UE may be allowed to include a priority indication, for example p2 mentioned above, when the UE sends a scheduling request. As another alternative, when UE is static or movement is within a certain range or threshold, the UE may be allowed to use a configured grant (CG) physical uplink shared channel (PUSCH) configured with the priority p2.

The use of the SR or CG-PUSCH may be further conditioned on a measurement criterion. The measurement criterion may be any of the following, alone or in any combination with one another: when a variation in reference signal received power (RSRP) exceeds a threshold during a time window; when an average level of a predetermined or configured number, N, of RSRP measurements is less than a threshold value; when a maximum value of measured RSRP within a time window is less than a threshold value; or when an average level of RSRP measurements for a plurality of beams, for example a set of SS/PBSCH block indices, is less than a threshold value. Each of these values can be referred to as measurement values. The threshold value may be configured from a gNB. The RSRP measurement for a beam may be RSRP measurement for a reference signal resource such as a CSI-RS (Channel State Information Reference Signal) resource or a synchronization signal block (SSB) resource, as gNB/transmission reception point (TRP) may use a specific transmission beam for a reference signal resource in NR.

The time window can be expressed as t∈{t_1,t_2}. The threshold values can be different for different conditions. For example, the threshold for the maximum value condition may be different from the threshold for the average level condition.

In the case of stationary or slow moving UEs, the major reason of RSRP measurement change may be from satellite movement. This is not the same as the handover or cell-reselection criterion for a static UE in a typical terrestrial network with fixed access points.

The gNB/satellite may understand that the priority indicator of priority 2 in the SR resource implies that the UE is about to go out of coverage. Similarly, the gNB/satellite may understand that the received PUSCH data on this CG-PUSCH resource is from a UE that is about to go out of coverage of a satellite type gNB.

A satellite/gNB may schedule enough PUSCH resources with very low latency. In addition, the gNB may try to allocate high processing resources for reception of data from this PUSCH resource as it may not be possible to request re-transmission if there is a decoding failure.

FIG. 1 illustrates a signal flow diagram of a method involving a scheduling request, according to certain embodiments. As shown in FIG. 1, at 105, the gNB may provide to the UE estimated timing for the UE to leave satellite coverage and/or information on UE location and elevation to assist the UE's own decision making. At 110, the UE can make a decision on last-minute transmission based on RSRP, localization, primary cell (PCell) identifier (ID), and elevation angle. This decision can be a decision can be a joint decision that the UE will soon go out of satellite coverage, and that the UE has data that should be transmitted before the UE goes out of satellite coverage. Accordingly, at 120, the UE can send a scheduling request with a priority indicator of a NTN UE. This may be priority indicator p2, as mentioned above. The UE can be referred to as a NTN UE, because the UE is being served by a NTN access point. At 130, the gNB provide a scheduling grant with prioritized uplink (UL) resources for the NTN UE. The UE can then, at 140, send the prioritized data transmission before the UE leaves the satellite's coverage.

FIG. 2A illustrates a signal flow diagram of a method involving configured grant physical uplink shared channel, according to certain embodiments. As shown in FIG. 2A, at 205, the UE may provide information on elevation angle and location to the gNB. At 210, the gNB may estimate the time at which the UE may lose satellite coverage. Accordingly, upon such determination, at 220, the gNB can provide an indication of configured grant resource for one or more priority levels that the NTN UE can access for uplink transmission. At 230, the UE can make a decision on last-minute transmission. As at 110 in FIG. 1, at 230 in FIG. 2A the UE may take into account measurement values, such as RSRP, as well as localization, PCell ID, and elevation angle. The decision at 230 can be informed by the gNB at 225 providing an estimated timing of when the UE will leave satellite coverage or information on UE location and elevation angle to assist the UE's own decision making. At 240, the UE can send prioritized data transmission via CG-based PUSCH before the UE leaves the satellite's coverage area.

Figure 2B:
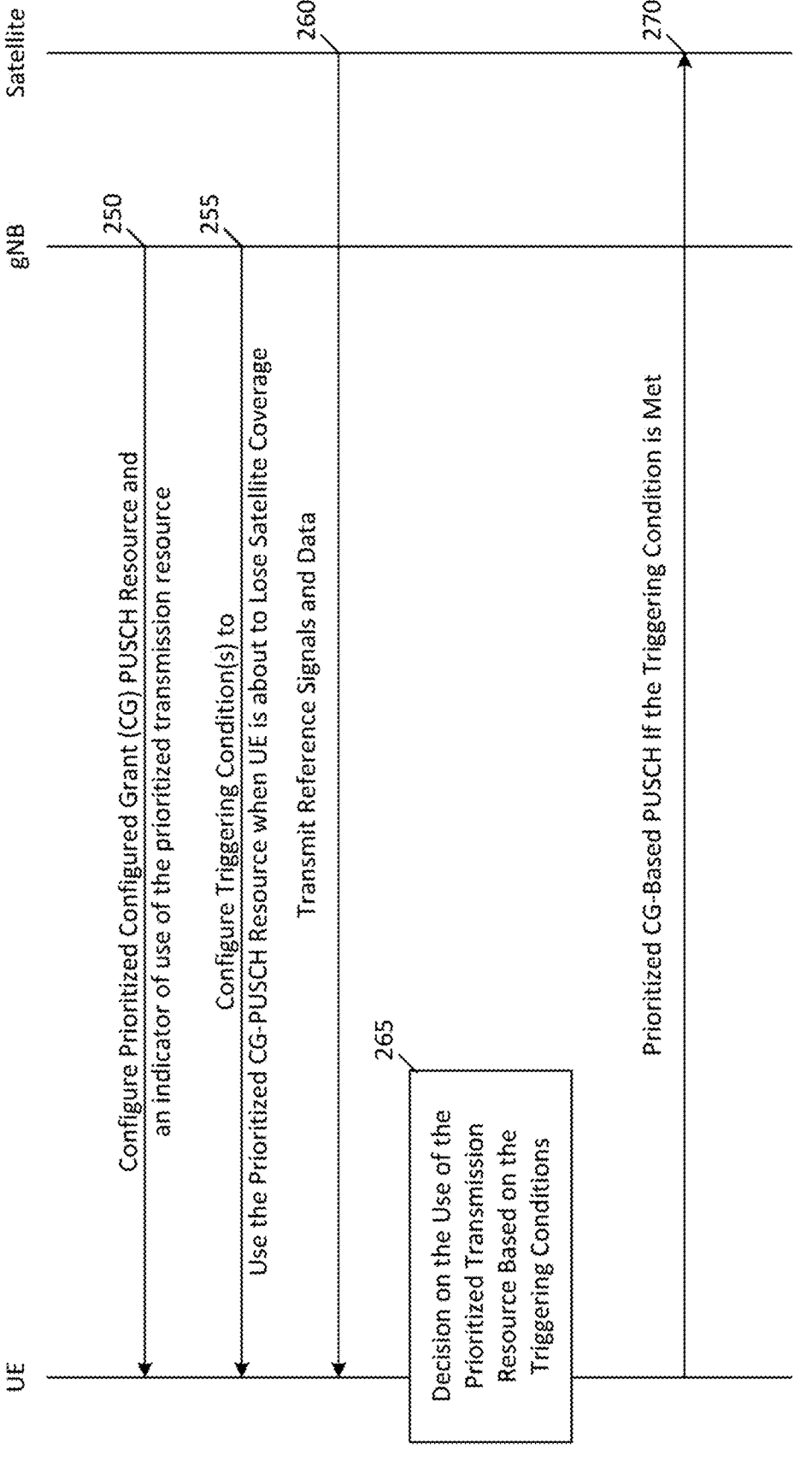
FIG. 2B illustrates a further signal flow diagram of a method involving configured grant physical uplink shared channel, according to certain embodiments.

FIG. 2B illustrates a further signal flow diagram of a method involving configured grant physical uplink shared channel, according to certain embodiments. As shown in FIG. 2B, at 250 the gNB or other access node may configure a prioritized configured grant physical uplink shared channel (CG-PUSCH) resource and an indicator of use of the prioritized transmission resource. At 254, the access node can also configure the UE with one or more triggering conditions as to under what circumstances, for example cell edge conditions and other conditions, to use the prioritized CG-PUSCH resources. Thus, for example, the UE can be configured to use the prioritized CG-PUSCH resources and the indicator when the UE is about to lose satellite coverage.

At 260, the satellite may transmit reference signals and data to the UE. At 265, the UE may make a decision about the use of the prioritized transmission resource based on the triggering conditions. Then, at 270, the UE can send prioritized CG-based PUSCH if the triggering condition or triggering conditions are met.

Figure 3:
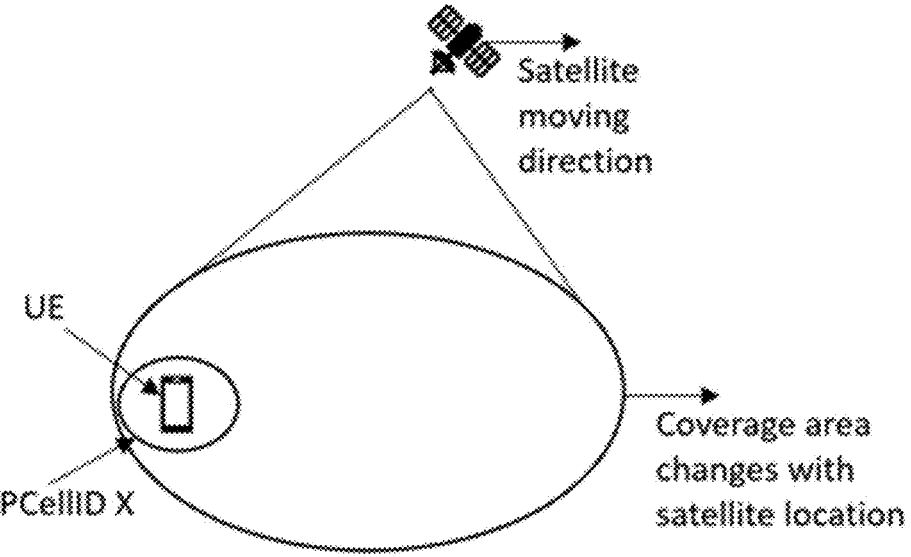
FIG. 3 illustrates coverage of a user equipment using a satellite in orbit, according to certain embodiments.

FIG. 3 illustrates coverage of a user equipment using a satellite in orbit. As shown in FIG. 3, a UE can be in a primary cell, shown as having PCell ID X. This may be one of many (not illustrated) cells within the coverage of a given satellite. In the example of FIG. 3, the satellite is moving to the right side of the page, and the coverage area likewise changes with the satellite location. Thus, in this particular example, the UE may be in a cell-edge condition, and may detect this in a variety of ways, including by analyzing recent measurements of the signals from the satellite.

Figure 4:
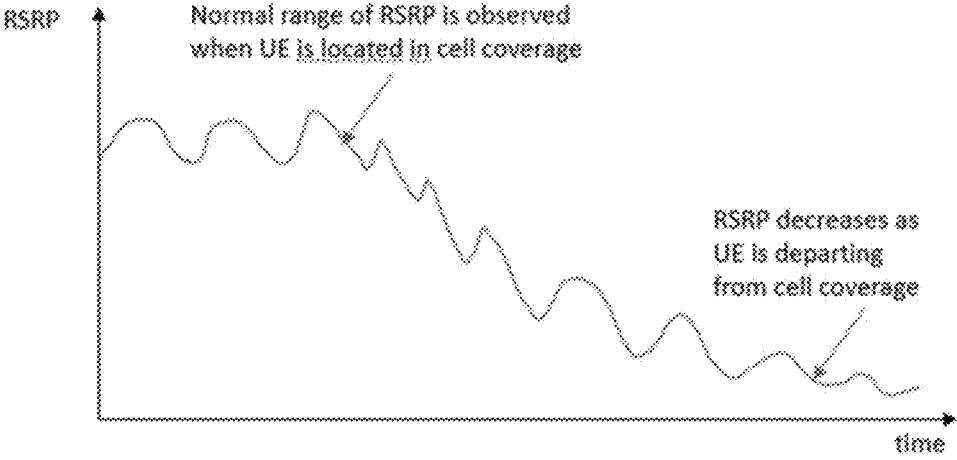
FIG. 4 illustrates reference signal received power measurements over time in satellite coverage, according to certain embodiments.

FIG. 4 illustrates reference signal received power measurements over time in satellite coverage. As shown in FIG. 4, the normal range of RSRP may be experienced when the UE is located in cell coverage. Over time, as the UE gets closer to the cell-edge, the RSRP may decrease, which can provide a basis for knowing that the UE is about to depart entirely from cell coverage of the satellite. In the example of FIG. 3, the location of the UE at the left of the coverage area may correspond to the right hand portion of the graph in FIG. 4. Thus, FIG. 3 illustrates how a UE can get close to the edge of coverage area, while FIG. 4 illustrates RSRP variation as the UE moves toward the edge of the satellite's cell coverage.

UEs can measure signal strength of reference signals such as RSRP of SSB/CSI-RS transmitted from a satellite, and the UE can track of change of the RSRP value from the satellite. FIG. 4 illustrates what a tracked RSRP value may look like over time for a given UE in a given satellite coverage.

Additionally, UE can monitor PCell ID to detect that the UE is moving closer to the edge of the satellite's coverage. For instance, UE can keep monitoring the PCell ID during the period where UE is in a satellite's coverage. Therefore, when UE is moving across different cells in the satellite's coverage, if a newly associated cell is located outside a previously connected cell, the UE can determine that the relative location of the UE is moving toward the edge of the satellite coverage. Since the UE may know the PCell ID of the gNB, as shown in FIG. 3, the UE may be able to track the change of the UE's relative location in the satellite coverage.

Also, the UE can keep observing the change of the elevation angle of the received beam. If the elevation angle is increasing, the UE can know that the satellite is moving toward the UE. Otherwise, if the elevation angle is decreasing, the UE can know that the satellite coverage is moving away from the UE. In addition, to consider the azimuth angle, the UE can combine the information including the UE's localization and satellite ephemeris to estimate the current relative location of the UE within the satellite coverage.

Figure 5:
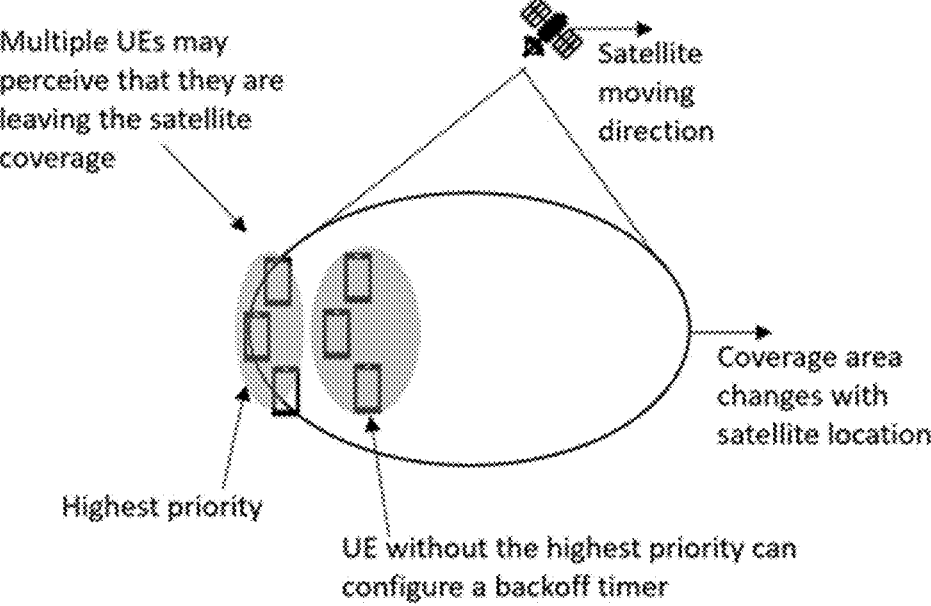
FIG. 5 illustrates a coverage scenario in which multiple user equipment may co-exist in closer or farther relative proximity to an edge of a cell coverage, according to certain embodiments.

FIG. 5 illustrates a coverage scenario in which multiple user equipment may co-exist in closer or farther relative proximity to an edge of a cell coverage, according to certain embodiments. As shown in FIG. 5, in certain embodiments, a UE may set a backoff timer to give priority to another more urgent UE that is closer to the cell edge.

As in FIG. 3, in FIG. 5, the satellite and coverage area may be moving to the right. By contrast, the UEs in FIG. 5 may be stationary or slow moving relative the satellite. Multiple UEs may detect that they are leaving the satellite priority. The UEs that are closest to the left edge may, in this example, be given the highest priority. By contrast, the UEs closer to the center can configure a backoff timer.

In certain embodiments, the dedicated/additional priority indicator/state may be multiple. The multiple priority indicator may be useful when a subset of UEs near the satellite coverage have a higher urgency to transmit the data as shown in FIG. 5. Depending on the urgency according to the relative distance between UE and Satellite, or the remaining time before going to out of coverage due to the satellite movement, the priority indicator/state can be different. Also, multiple threshold values may be configured for the triggering criterion condition described above.

Figure 6A:
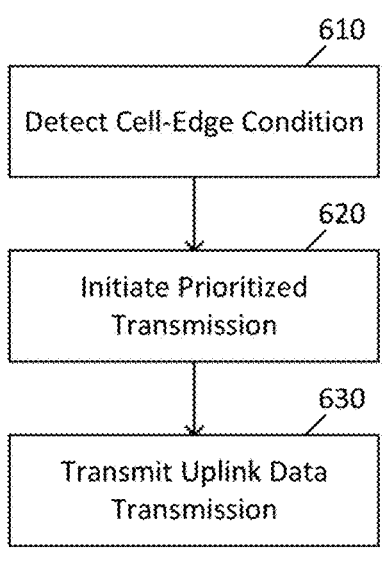
FIG. 6A illustrates a method according to certain embodiments.

FIG. 6A illustrates a method according to certain embodiments. The method can include, at 610, detecting, by a user equipment, a cell-edge condition while the user equipment is being served through non-terrestrial radio access. The method can also include, at 620, initiating, by the user equipment, prioritized transmission conditioned on the detected cell-edge condition. The method can further include, at 630, transmitting, by the user equipment, uplink data transmission using the prioritized transmission before leaving coverage provided by the non-terrestrial radio access.

The cell-edge condition can include a first predetermined threshold of variation in measurement values. The initiating the prioritized transmission can be conditioned on the first predetermined threshold being exceeded during a time window. Thus, in this example, the cell-edge condition can be that the first predetermined threshold of variation in measurement values is exceeded. By way of reference, note that in FIG. 4, during an initial period of connection to the cell, the measurement value (in that example, RSRP) may be relatively high with a small variations from that high value, but eventually may become much lower than the high value, as the UE approaches the cell edge.

In another example, the cell-edge condition can include a first predetermined threshold of average level of measurement values. The initiating the prioritized transmission can be conditioned on the first predetermined threshold not being exceeded during a time window. Thus, in this example, the cell-edge condition can be that the first predetermined threshold of average level of measurement values is not exceeded. By way of reference, note that in FIG. 4, during an initial period of connection to the cell, the average measurement value (in that example, RSRP) may be relatively high, but may gradually decrease as the UE approaches the cell edge.

In a further example, the cell-edge condition can include a first predetermined threshold of maximum value of measurement values. The initiating the prioritized transmission can be conditioned on the first predetermined threshold not being exceeded during a time window. Thus, in this example, the cell-edge condition can be that the first predetermined threshold of maximum level of measurement values is not exceeded. By way of reference, note that in FIG. 4, during an initial period of connection to the cell, the maximum values or local peaks of the measurement value (in that example, RSRP) may be relatively high, but may decrease as the UE approaches the cell edge.

In yet another example, the cell-edge condition can include a first predetermined threshold of average value of measurement values for multiple beams. The initiating the prioritized transmission can be conditioned on the first predetermined threshold not being exceeded during a time window. Thus, in this example, the cell-edge condition can be that the first predetermined threshold of average value of measurement values is not exceeded. While FIG. 4 does not explicitly a case with multiple beams, multiple beams received from a low earth satellite may have a degree of correlation, and consequently may have a similar pattern of decreasing received power or lower signal to interference plus noise ratio at the cell edge.

The measurement values can include at least one of reference signal received power, reference signal strength indicator, or signal to interference plus noise ratio. Nevertheless, other measurement values, such as reference signal received quality (RSRQ) or channel quality indicator (CQI) can also be used. The use of other measurement values is also permitted.

The initiating can be further conditioned on the user equipment being stationary or having movement less than a predetermined threshold. For example, if the user equipment was in aircraft in flight, the criteria may be different or the prioritization may not be followed.

The initiating at 620 in FIG. 6A can include sending a scheduling request with a priority indicator as illustrated in FIG. 2A. The transmitting at 630 can then occur after a scheduling grant is received. In another case illustrated by way of example in FIG. 3, the initiating can occur based on an internal determination by the user equipment after receiving a configured grant from the gNB or other access node. Accordingly, in such an example, the transmitting at 630 in FIG. 6A can include transmitting using a configured grant physical uplink shared channel associated with a priority indicator.

The prioritized transmission can be prioritized according to a plurality of priority levels. The plurality of priority levels can be associated with different degrees of cell-edge proximity. For example, there may be two or more thresholds of maximum or average RSRP, and a first priority level can be associated with one of the thresholds being exceeded (or not) and the second priority level can be associated with both of the thresholds being exceeded (or not). In this way, UEs closer to the edge can be prioritized over cells farther from the edge, as illustrated for example in FIG. 5. A plurality of thresholds of a measurement value can be used by the user equipment to select a priority level of the plurality of priority levels. In the case of priority determination being made by the access node, for example as in FIG. 3, the gNB or other access node can make the determination based on measurements at the access node, measurements reported from the UE, and/or a known position of the UE relative to the access point.

Figure 6B:
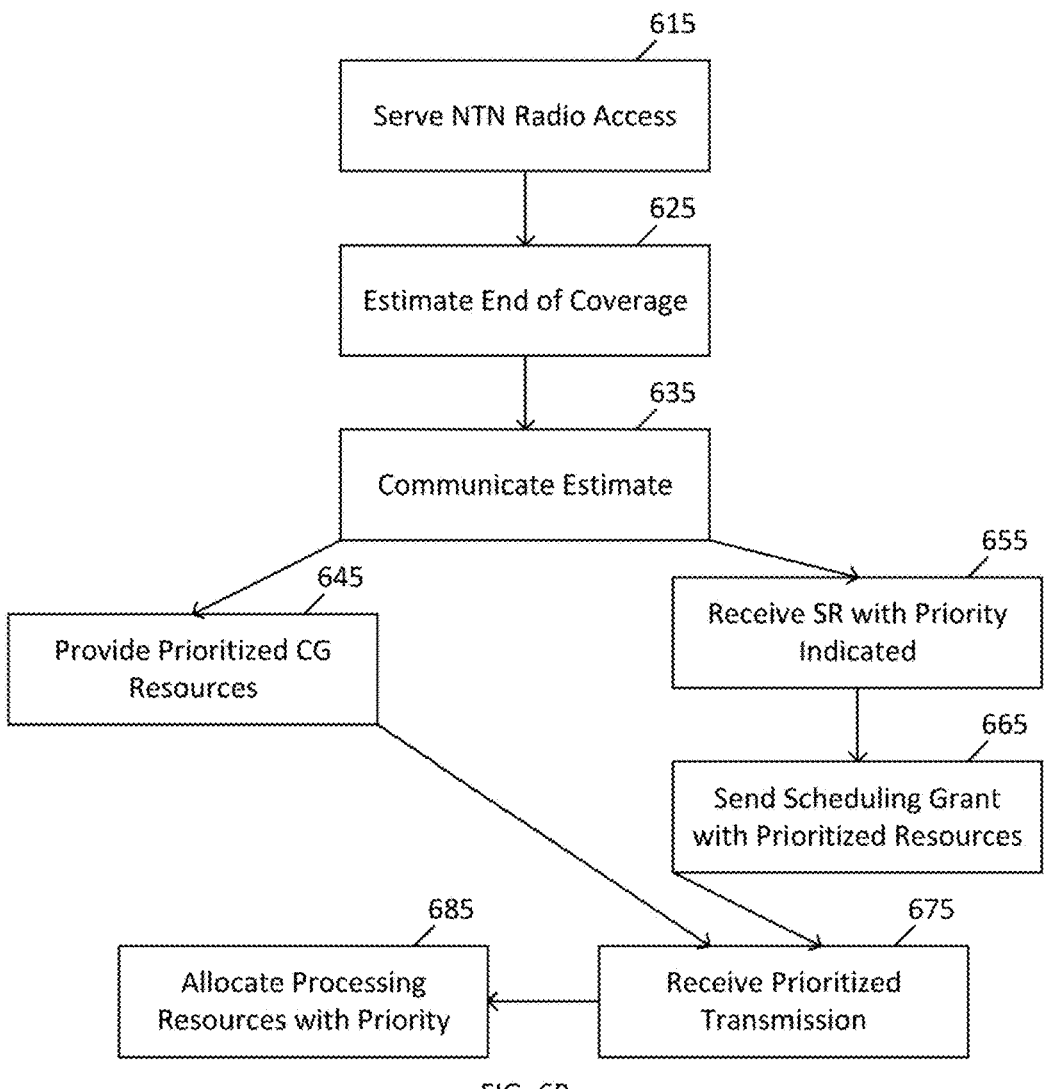
FIG. 6B illustrates a further method according to certain embodiments.

FIG. 6B illustrates a further method according to certain embodiments. The method of FIG. 6B may be used alone or in combination with the method of FIG. 6A. As shown in FIG. 6B, the method can include, at 615, serving non-terrestrial radio access to a user equipment. An end of coverage of the user equipment can be predicted by an access node performing the method, by the user equipment being served, or by both. As another alternative, the prediction could be made in the core network or by another node. The method can also include, at 675, receiving prioritized data transmission from the user equipment before the end time. The prioritized data transmission can be prioritized based on the predicted end of coverage. This prioritized data transmission can correspond to the uplink data transmitted at 630 in FIG. 6.

The method can also include, at 625, estimating the end of coverage of the user equipment. When the estimate is performed by a device other than the user equipment, the method can include, at 635, communicating the estimate of the end of coverage to the user equipment.

The method can also include, at 655, receiving a schedule request with a priority indicator associated with the predicted end of coverage. Responsive to this request, the method can include, at 665, providing a scheduling grant with prioritized resources based on the scheduling request.

The method can also include, as an alternative at 645, providing a prioritized configured grant resource to the user equipment. The prioritized data transmission can be received at 675 on the prioritized configured grant resource. The method can also include, at 685, allocating, with priority, processing resources to process the prioritized data transmission, based on the prioritization of the prioritized data transmission.

Figure 7:
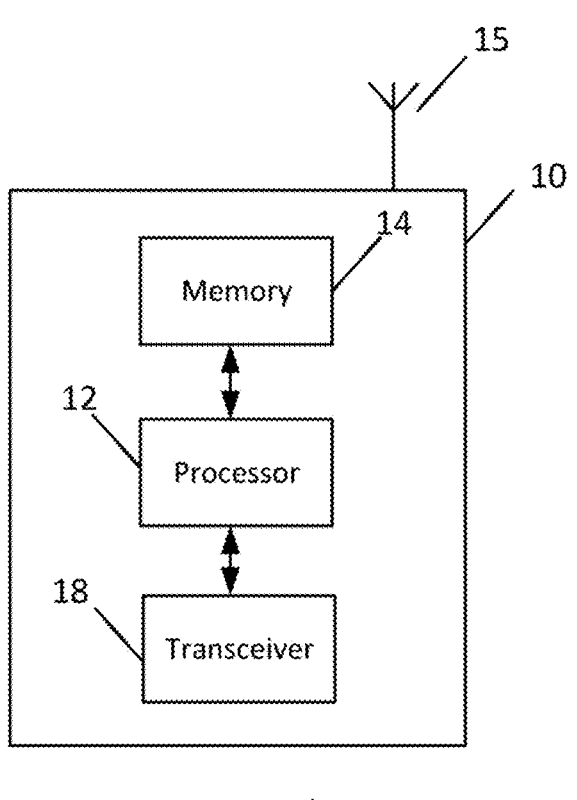
FIG. 7 illustrates an example block diagram of a system, according to an embodiment.
Figure 7:
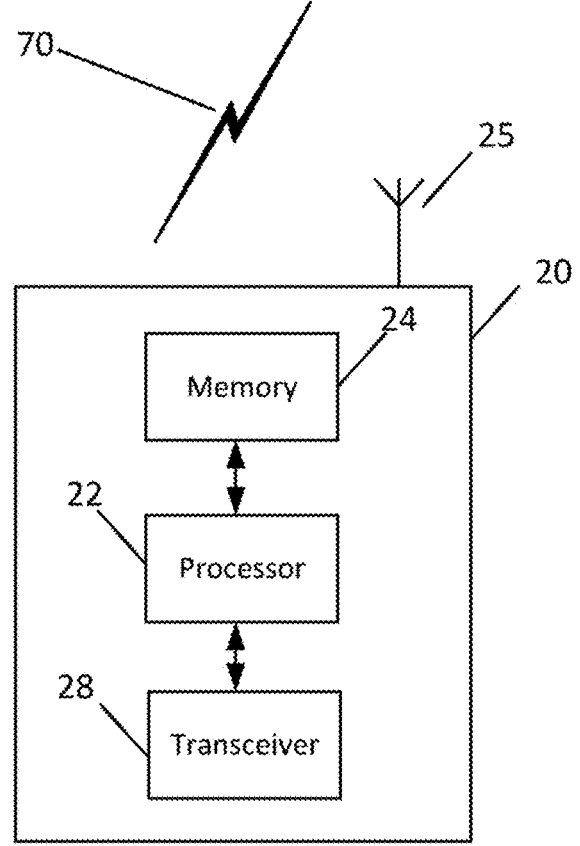

FIG. 7 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 7.

As illustrated in the example of FIG. 7, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 7, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be include any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/ means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-6, or any other method described herein. In some embodiments, as discussed herein, apparatus 10 may be configured to perform a procedure relating to providing priority access to non-terrestrial access, for example to assist in discontinuous coverage scenarios, for example.

FIG. 7 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7.

As illustrated in the example of FIG. 7, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-6, or any other method described herein. For example, in an embodiment, apparatus 20 may be controlled to perform a process relating to providing priority access to non-terrestrial access, for example to assist in discontinuous coverage scenarios, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, in certain embodiments the timely communication of urgent uplink data can be more readily accomplished particularly in cases of discontinuous coverage provided by non-terrestrial radio access. Thus, certain embodiments may present a technological improvement in the field of non-terrestrial network usage for, for example, smart sensors or other devices providing timely reports using enhanced machine type communication.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

CG Configured Grant
UE User Equipment
gNB gNodeB
TN Terrestrial Network
NTN Non-Terrestrial Network
IoT Internet of Thing
UL Uplink
DL Downlink
NW Network
PDCCH Physical Downlink Control Channel
PUSCH Physical Uplink Shared Channel

We claim:

1. An apparatus, comprising:
at least one processor; and
at least one memory storing instructions that, when executed by the at least one processor, cause the apparatus at least to perform
detecting a cell-edge condition while the apparatus is being served through non-terrestrial radio access;
initiating prioritized transmission conditioned on the detected cell-edge condition; and
transmitting uplink data transmission using the prioritized transmission before leaving coverage provided by the non-terrestrial radio access,
wherein the cell-edge condition comprises a first threshold of variation in measurement values, wherein the initiating the prioritized transmission is conditioned on the first threshold being exceeded during a time window, wherein the first threshold is predetermined or configured by a network.

2. The apparatus of claim 1, wherein the cell-edge condition comprises a first threshold of average level of measurement values, wherein the initiating the prioritized transmission is conditioned on the first threshold not being exceeded during a time window, wherein the first threshold is predetermined or configured by a network.

3. The apparatus of claim 1, wherein the cell-edge condition comprises a first threshold of maximum value of measurement values, wherein the initiating the prioritized transmission is conditioned on the first threshold not being exceeded during a time window, wherein the first threshold is predetermined or configured by a network.

4. The apparatus of claim 1, wherein the cell-edge condition comprises a first threshold of average value of measurement values for multiple beams, wherein the initiating the prioritized transmission is conditioned on the first threshold not being exceeded during a time window, wherein the first threshold is predetermined or configured by a network.

5. The apparatus of claim 1, wherein the measurement values comprise at least one of reference signal received power, reference signal strength indicator, or signal to interference plus noise ratio.

6. The apparatus of claim 1, wherein the initiating is further conditioned on a determination by the user equipment that the user equipment is stationary or has movement less than a second threshold, wherein the second threshold is predetermined or configured by a network.

7. The apparatus of claim 1, wherein the initiating comprises sending a scheduling request with a priority indicator.

8. The apparatus of claim 1, wherein the transmitting comprises transmitting using a configured grant physical uplink shared channel associated with a priority indicator.

9. The apparatus of claim 1, wherein the prioritized transmission is prioritized according to a plurality of priority levels, wherein the plurality of priority levels are associated with different degrees of cell-edge proximity.

10. The apparatus of claim 9, wherein a plurality of thresholds of a measurement value are used by the user equipment to select a priority level of the plurality of priority levels.

11. An apparatus, comprising:
at least one processor; and
at least one memory storing instructions that, when executed by the at least one processor, cause the apparatus at least to perform
detecting a cell-edge condition while the apparatus is being served through non-terrestrial radio access;
initiating prioritized transmission conditioned on the detected cell-edge condition; and
transmitting uplink data transmission using the prioritized transmission before leaving coverage provided by the non-terrestrial radio access,
wherein the cell-edge condition comprises a first threshold of variation in measurements values, wherein the initiating the prioritized transmission is conditioned on the first threshold being exceeded during a time window, wherein the first threshold is predetermined or configured by a network,
wherein the measurement values comprise at least one of reference signal received power, reference signal strength indicator, or signal to interference plus noise ratio.

12. An apparatus, comprising:
at least one processor; and
at least one memory storing instructions that, when executed by the at least one processor, cause the apparatus at least to perform
detecting a cell-edge condition while the apparatus is being served through non-terrestrial radio access;
initiating prioritized transmission conditioned on the detected cell-edge condition; and transmitting uplink data transmission using the prioritized transmission before leaving coverage provided by the non-terrestrial radio access, wherein the cell-edge condition comprises a first threshold of variation in measurements values, wherein the initiating the prioritized transmission is conditioned on the first threshold being exceeded during a time window, wherein the first threshold is predetermined or configured by a network, wherein the initiating is further conditioned on a determination by the user equipment that the user equipment is stationary or has movement less than a second threshold, wherein the second threshold is predetermined or configured by a network.

\* \* \* \* \*